(12) United States Patent
Suzuki (10) Patent No.: US 11,489,458 B2
(45) Date of Patent: Nov. 1, 2022

(54) MULTI-PHASE CONVERTER CONTROL DEVICE

(71) Applicant: KEIHIN CORPORATION, Tokyo (JP)

(72) Inventor: Takami Suzuki, Utsunomiya (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/122,079

(22) Filed: Dec. 15, 2020

(65) Prior Publication Data

US 2021/0281192 A1 Sep. 9, 2021

(30) Foreign Application Priority Data

Mar. 5, 2020 (JP) .............................. JP2020-037623

(51) Int. Cl.
  *H02M 7/53* (2006.01)
  *H02M 7/5387* (2007.01)
  *H02M 1/00* (2006.01)
  H02M 1/084 (2006.01)
  H02M 3/158 (2006.01)

(52) U.S. Cl.
  CPC ....... *H02M 7/53875* (2013.01); *H02M 1/007* (2021.05); *H02M 1/0025* (2021.05); *H02M 1/0043* (2021.05); *H02M 1/084* (2013.01); *H02M 3/1586* (2021.05)

(58) Field of Classification Search
  CPC .. H02M 3/158; H02M 3/1584; H02M 3/1588; H02M 1/084; H02M 7/53875; H02M 3/1586; H02M 1/007; H02M 1/0025; H02M 1/0043
  See application file for complete search history.

(56) References Cited

U.S. PATENT DOCUMENTS

2015/0102759 A1* 4/2015 Shimomugi ............ H02M 7/06
                                                               318/504
2019/0181766 A1   6/2019 Ge et al.

FOREIGN PATENT DOCUMENTS

JP      3969165 B    9/2007
JP   2011109869 A    6/2011
              (Continued)

OTHER PUBLICATIONS

JPO Notice of Reasons for Rejection for corresponding JP Application No. 2020-037623; dated Nov. 17, 2020.

*Primary Examiner* — Gary L Laxton
(74) *Attorney, Agent, or Firm* — Cantor Colburn LLP (57) ABSTRACT

This multi-phase converter control device performs PWM control on driving of a multi-phase converter. The multi-phase converter is configured such that a plurality of converters connected to each other in parallel have reactors, and the reactors are magnetically coupled with each other and step up an input voltage to generate a step-up voltage. This multi-phase converter control device includes a feedback control unit configured to perform feedback control such that the step-up voltage is a target voltage, a PWM control unit configured to generate a PWM signal on the basis of a voltage command value output from the feedback control unit, and a drive unit configured to drive the multi-phase converter on the basis of the PWM signal. The feedback control unit calculates a step-up ratio of the multi-phase converter and changes a control gain in the feedback control on the basis of the step-up ratio.

7 Claims, 6 Drawing Sheets

(56) References Cited

FOREIGN PATENT DOCUMENTS

| | | |
|---|---|---|
| JP | 2013115894 A | 6/2013 |
| JP | 5734441 B2 | 6/2015 |
| JP | 2015171312 A | 9/2015 |
| JP | 2018057203 A | 4/2018 |
| JP | 2020162371 A | 10/2020 |

\* cited by examiner

| STEP-UP RATIO P | PROPORTIONAL GAIN Kp | INTEGRATED GAIN Kg |
|---|---|---|
| P1 | Kp1 | Kg1 |
| P2 | Kp2 | Kg2 |
| P3 | Kp3 | Kg3 |
| P4 | Kp4 | Kg4 |
| ⋮ | ⋮ | ⋮ |

MULTI-PHASE CONVERTER CONTROL DEVICE

CROSS-REFERENCE TO RELATED APPLICATION

The present invention claims priority under 35 U.S.C. § 119 to Japanese Patent Application No. 2020-037623, filed Mar. 5, 2020, the entire content of which is incorporated herein by reference.

BACKGROUND OF THE INVENTION

Field of the Invention

The present invention relates to a multi-phase converter control device.

Description of Related Art

Japanese Patent No. 5734441 discloses a converter control device that performs PWM control on a multi-phase converter composed of a first converter and a second converter connected in parallel. This converter control device performs feedback control such that a step-up voltage of the multi-phase converter is a target voltage.

Incidentally, when reactors of the first converter and the second converter of the multi-phase converter to be controlled are magnetically coupled to each other, a plant model of the multi-phase converter (model described by a mathematical model) is composed of two plant models with different step-up ratios. Therefore, a control device is provided for each plant model with a different step-up ratio to control the multi-phase converter in which reactors are magnetically coupled to each other.

SUMMARY OF THE INVENTION

However, if a control device is provided for each plant model with a different step-up ratio, the device becomes large, and thus the present inventor came up with the idea to approximate two plant models with different step-up ratios to one plant model and control the multi-phase converter using one control device.

However, if feedback control is performed with one control device, it is assumed that a control gain does not fit into an area with a certain step-up ratio, and a step-up voltage of the multi-phase converter causes hunting. As a result, the controllability of the multi-phase converter may decrease.

The present invention has been made in view of such circumstances, and an object of the present invention is to provide a multi-phase converter control device that improves the controllability of a multi-phase converter.

(1) One aspect of the present invention, is a multi-phase converter control device that performs PWM control on driving of a multi-phase converter configured such that a plurality of converters connected to each other in parallel have reactors, and the reactors are magnetically coupled with each other and step up an input voltage to generate a step-up voltage. The multi-phase converter control device includes: a feedback control unit configured to perform feedback control such that the step-up voltage is a target voltage; a PWM control unit configured to generate a PWM signal on the basis of a voltage command value output from the feedback control unit; and a drive unit configured to drive the multi-phase converter on the basis of the PWM signal. The feedback control unit calculates a step-up ratio of the multi-phase converter and changes a control gain in the feedback control on the basis of the step-up ratio.

(2) The multi-phase converter control device of (1) described above may have the following configuration. The feedback control unit includes: a voltage control unit configured to generate a current command value by applying PI control to a deviation between the step-up voltage and the target voltage; a current control unit configured to generate the voltage command value by applying PI control to a deviation between the current command value and a phase current input to the multi-phase converter; and a step-up ratio calculation unit configured to calculate the step-up ratio, wherein the voltage control unit changes the control gain for generating the current command value on the basis of the step-up ratio.

(3) In the multi-phase converter control device of (2) described above, the voltage control unit may include: a storage unit configured to store a proportional gain map indicating a corresponding relationship between the step-up ratio and a proportional gain, and an integrated gain map indicating a corresponding relationship between the step-up ratio and an integrated gain; an acquisition unit configured to acquire the proportional gain corresponding to the step-up ratio obtained by the step-up ratio calculation unit from the proportional gain map, and to acquire the integrated gain corresponding to the step-up ratio from the integrated gain map; and a calculation unit configured to execute the PI control using the proportional gain and the integrated gain acquired by the acquisition unit.

(4) In the multi-phase converter control device of any one of (1) to (3) described above, the feedback control unit may change the control gain in the feedback control on the basis of the step-up ratio when the step-up ratio is equal to or less than a predetermined step-up ratio.

As described above, according to each of the aspects of the present invention described above, it is possible to improve the controllability of a multi-phase converter.

DETAILED DESCRIPTION OF THE INVENTION

Hereinafter, a multi-phase converter control device according to an embodiment of the present invention will be described with reference to the drawings.

Figure 1:
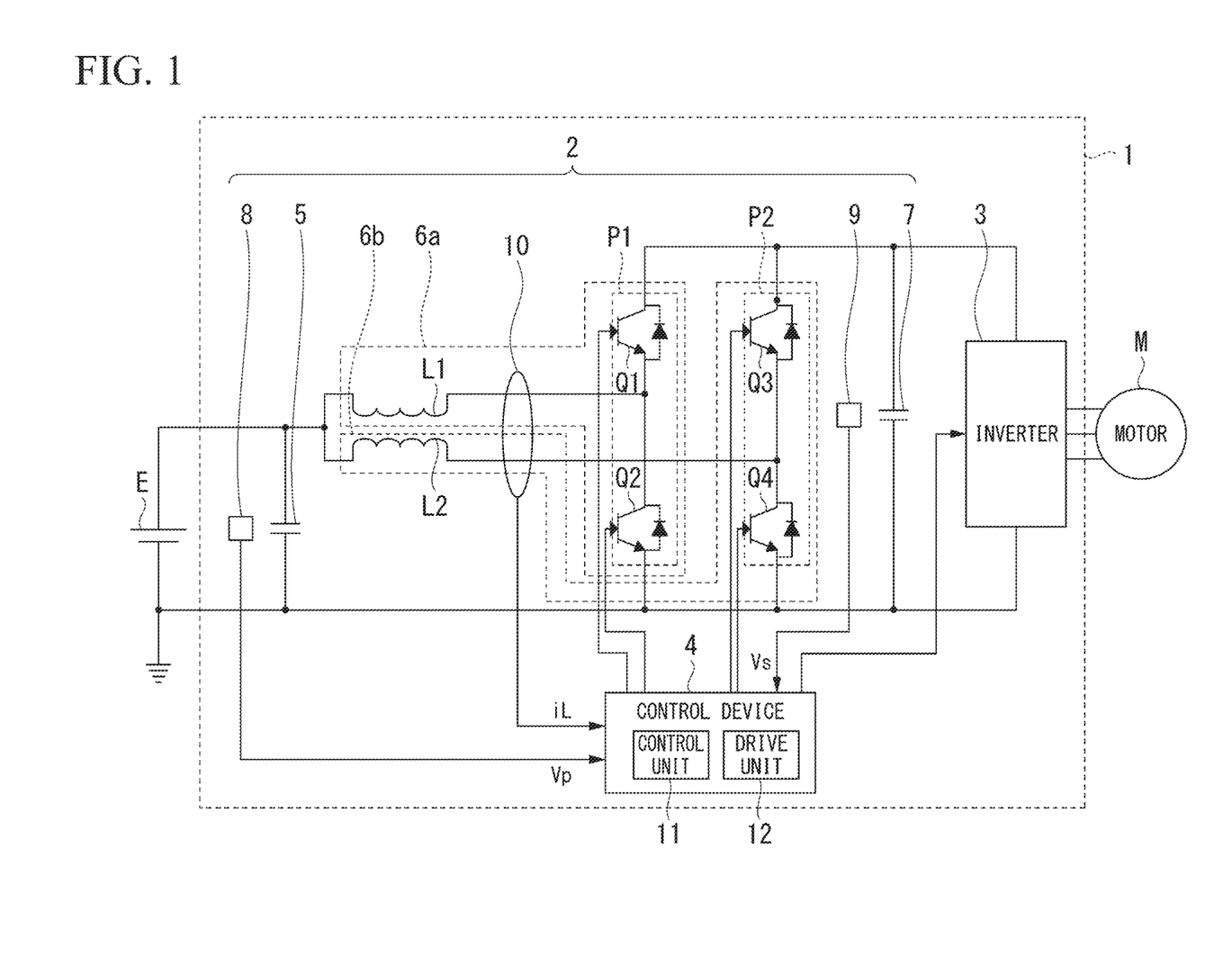
FIG. 1 is a circuit diagram which shows a schematic configuration of a power conversion device 1 having a multi-phase converter control device according to an embodiment of the present invention.

FIG. 1 is a diagram which shows an example of a schematic configuration of a power conversion device (for example, a power control unit (PCU)) 1 which includes a multi-phase converter control device according to the present embodiment. The power conversion device 1 is mounted in a vehicle that travels using a motor M as a power source, such as a hybrid vehicle or an electric vehicle.

However, the motor M may be a motor generator. That is, the motor M may function as a generator driven by an engine of the vehicle. For example, the motor M is a three-phase (U, V, W) brushless motor.

As shown in FIG. 1, the power conversion device 1 includes a multi-phase converter 2, an inverter 3, and a control device 4. The control device 4 is an example of the "multi-phase converter control device" of the present invention.

The multi-phase converter 2 is configured as, for example, an in-vehicle multi-phase DCDC converter. The multi-phase converter 2 steps up a DC voltage VB input from a DC power supply E to a predetermined voltage Vc (hereinafter referred to as a "step-up voltage") and outputs the step-up voltage to the inverter 3. Note that a case in which the multi-phase converter 2 is a two-phase DCDC converter will be described in the present embodiment, but the present invention is not limited thereto, and the number of phases is not particularly limited as long as it is two or more. In the following description, a specific configuration of the multi-phase converter 2 according to the present embodiment will be described. Note that the DC voltage VB is an example of an "input voltage" of the present invention.

The multi-phase converter 2 includes a primary-side capacitor 5, converters 6a and 6b, a secondary-side capacitor 7, a first voltage sensor 8, a second voltage sensor 9, and a current sensor 10.

In the primary-side capacitor 5, one end is connected to a positive terminal of the DC power supply E and the other end is connected to a negative terminal of the DC power supply E. The primary-side capacitor 5 is a smoothing capacitor that smooths the DC voltage VB output from the DC power supply E.

The converters 6a and 6b are connected in parallel to each other between the DC power supply E and the inverter 3. In the present embodiment, a case in which the converters 6a and 6b are step-up converters will be described, but the present invention is not limited thereto. For example, they may be step-down converters or step-up/step-down converters.

The converter 6a (the first converter) includes a reactor L1 (a first reactor) and a power module P1.

In the reactor L1, one end is connected to one end of the primary-side capacitor 5 and the other end is connected to the power module P1.

The power module P1 includes a switching element Q1 and a switching element Q2 (a first switching element) which are connected to each other in series. In the present embodiment, a case in which the switching element Q1 and the switching element Q2 are insulated gate bipolar transistor (IGBTs) will be described, but the present invention is not limited thereto, and they may be, for example, field effect transistors (FETs) or the like.

In the switching element Q1, a collector terminal is connected to one end of the secondary-side capacitor 7 and an emitter terminal is connected to a collector terminal of the switching element Q2.

An emitter terminal of the switching element Q2 is connected to the negative terminal of the DC power supply E.

In addition, a connection point of the emitter terminal of the switching element Q1 and the collector terminal of the switching element Q2 is connected to the other end of the reactor L1. Each gate terminal of the switching element Q1 and the switching element Q2 is connected to the control device 4.

The converter 6b (the second converter) includes a reactor L2 (a second reactor) and a power module P2.

In the reactor L2, one end is connected to one end of the primary-side capacitor 5, and the other end is connected to the power module P2. Note that the reactor L1 and the reactor L2 are magnetically coupled to each other.

When the reactor L1 and the reactor L2 are not distinguished from each other, they are referred to as reactors L.

The power module P2 includes a switching element Q3 and a switching element Q4 which are connected to each other in series. Note that a case in which the switching element Q3 and the switching element Q4 (a second switching element) are IGBTs will be described in the present embodiment, but the present invention is not limited thereto, and they may be, for example, FETs or the like.

In the switching element Q3, a collector terminal is connected to one end of the secondary-side capacitor 7, and an emitter terminal is connected to a collector terminal of the switching element Q4.

An emitter terminal of the switching element Q4 is connected to the negative terminal of the DC power supply E.

In addition, a connection point of an emitter terminal of the switching element Q3 and the collector terminal of the switching element Q4 is connected to the other end of the reactor L2. Each gate terminal of the switching element Q3 and the switching element Q4 is connected to the control device 4.

The secondary-side capacitor 7 is a smoothing capacitor in which one end is connected to collector terminals of the switching elements Q1 and Q3, and the other end is connected to the negative terminal of the DC power supply E.

The first voltage sensor 8 is connected between the terminals of the DC power supply E, and detects a DC voltage VB output from the DC power supply E. In other words, the first voltage sensor 8 is a sensor that is attached between the terminals of the primary-side capacitor 5, and detects a voltage on a primary-side of a multi-phase converter (hereinafter referred to as a "primary-side voltage") Vp. The primary-side voltage Vp corresponds to a voltage between the terminals (between one end and the other end) of the primary-side capacitor 5, and indicates the same value as the DC voltage VB. The first voltage sensor 8 outputs the detected primary-side voltage Vp to the control device 4.

The second voltage sensor 9 detects a potential difference between both ends of the secondary-side capacitor 7, that is, the step-up voltage Vc stepped up by the converters 6a and 6b. This step-up voltage Vc is a voltage on a secondary side of the multi-phase converter. The second voltage sensor 9 outputs the detected step-up voltage Vc to the control device 4. Note that the step-up voltage Vc detected by the second voltage sensor 9 is referred to as a "secondary-side voltage Vs." The second voltage sensor 9 outputs the detected secondary-side voltage Vs to the control device 4.

The current sensor 10 is a single sensor that is provided on a primary side of the converters 6a and 6b, and detects phase currents of both the first phase current iLa and a second phase current iLb that flow in the same direction. That is, the current sensor 10 outputs the detected phase current iL to the control device 4. Current directions of each of the phase currents (the first phase current iLa and the second phase current iLb) of the phase current iL detected by the current sensor 10 are the same direction as each other. Note that the primary side of the converters 6a and 6b is between a positive terminal of a power supply E and a connection point of the emitter terminal of the switching element Q1 and the collector terminal of the switching element Q2, or between the positive terminal of the power supply E and a connection point of the emitter terminal of the switching element Q3 and the collector terminal of the switching element Q4.

The inverter 3 converts the step-up voltage Vc output from the multi-phase converter 2 into an AC voltage and supplies the AC voltage to the motor M according to control of the control device 4.

The control device 4 controls driving of the converters 6a and 6b. Specifically, the control device 4 performs switching control on a pair of switching elements Q1 and Q2 and a pair of switching elements Q3 and Q4 at different timings, and thereby currents of different phases (for example, 180° phase difference) flow through the converters 6a and 6b. That is, the control device 4 generates a first PWM signal, controls driving of the converter 6a on the basis of the first PWM signal, generates a second PWM signal, and controls driving of the converter 6b on the basis of the second PWM signal. The first PWM signal and the second PWM signal are signals whose phases are exactly 180° different from each other. As a result, the multi-phase converter 2 can generate a stable step-up voltage Vc with few ripples.

In the following description, a configuration of the control device 4 according to the present embodiment will be described.

The control device 4 includes a control unit 11 and a drive unit 12.

The control unit 11 generates a first PWM signal and a second PWM signal. The drive unit 12 controls the converters 6a and 6b on the basis of the first PWM signal and the second PWM signal. That is, the drive unit 12 outputs a gate signal based on the first PWM signal to the converter 6a, and outputs a gate signal based on the second PWM signal to the converter 6b. For example, the drive unit 12 is a gate drive circuit.

Figure 2:
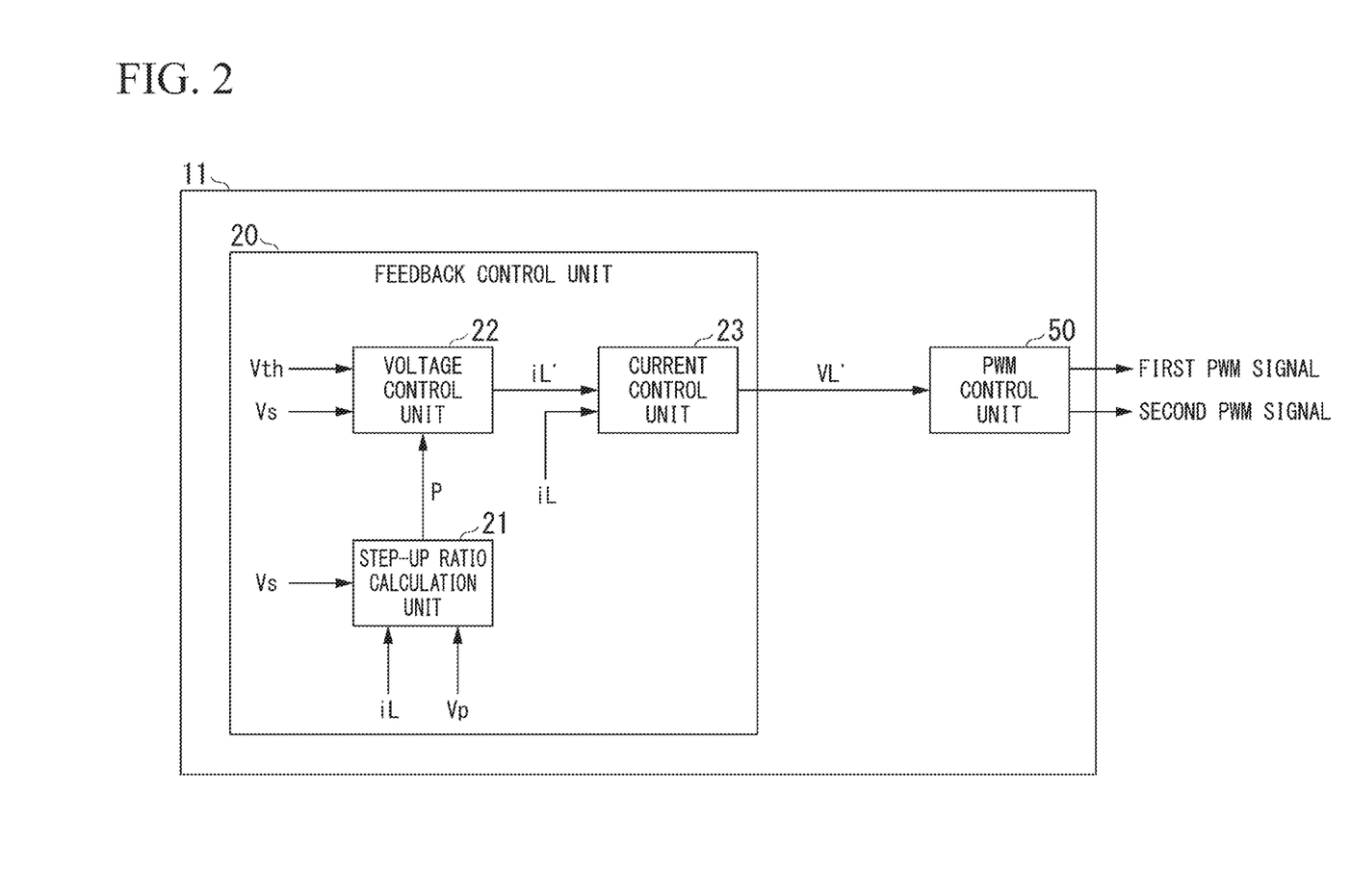
FIG. 2 is a schematic configuration diagram of a control unit 11 according to the same embodiment.

In the following description, a configuration of the control unit 11 according to the present embodiment will be described with reference to FIG. 2. FIG. 2 is a schematic configuration diagram of the control unit 11 according to the present embodiment.

The control unit 11 includes a feedback control unit 20 and a pulse width modulation (PWM) control unit 50.

The feedback control unit 20 generates a voltage command value VL' for causing the step-up voltage Vc that is a step-up voltage of the multi-phase converter 2 to follow a target voltage Vth.

The PWM control unit 50 generates a first PWM signal and a second PWM signal on the basis of the voltage command value VL' output from the feedback control unit 20. Here, the first PWM signal and the second PWM signal are signals whose phases are 180 degrees different from each other. The PWM control unit 50 generates one or more carrier waves (triangular waves), and generates a first PWM signal and a second PWM signal by comparing this carrier wave with the voltage command value VL'. For example, the PWM control unit 50 may generate a first carrier wave and a second carrier wave whose phase is 180° different from that of the first carrier wave. Then, the PWM control unit 50 generates a first PWM signal by comparing the first carrier wave with the voltage command value VL', and generates a second PWM signal by comparing the second carrier wave with the voltage command value VL'.

Next, the feedback control unit 20 according to the present embodiment will be described.

The feedback control unit 20 includes a step-up ratio calculation unit 21, a voltage control unit 22, and a current control unit 23.

The step-up ratio calculation unit 21 calculates a step-up ratio P of the multi-phase converter 2.

For example, the step-up ratio calculation unit 21 acquires the primary-side voltage Vp detected by the first voltage sensor 8, the secondary-side voltage Vs detected by the second voltage sensor 9, and the phase current iL detected by the current sensor 10. The step-up ratio calculation unit 21 stores combined resistance rz in advance. The combined resistance rz is combined resistance of a resistance component rL in the reactor L in the multi-phase converter 2 and a resistance component rsw of a switching element when the phase current iL flows through the multi-phase converter 2. Each of the reactor L1 and the reactor L2 has the same resistance component rL.

For example, the step-up ratio calculation unit 21 calculates a step-up ratio P on the basis of the primary-side voltage Vp, the secondary-side voltage Vs, the phase current iL, and the combined resistance rz. Specifically, the step-up ratio calculation unit 21 calculates the step-up ratio P by substituting the primary-side voltage Vp, the secondary-side voltage Vs, the phase current iL, and the combined resistance rz into the equation (1) shown below.

$$\text{Step-up ratio } P=(Vs-iL\times rz)/Vp \qquad (1)$$

The step-up ratio calculation unit 21 outputs the calculated step-up ratio P to the voltage control unit 22.

The voltage control unit 22 executes feedback control using PI control or PID control for a voltage deviation ΔVs that is a deviation between the secondary-side voltage Vs and the target voltage Vth set in advance, thereby calculating a current command value iL' for making this voltage deviation ΔVs close to zero.

The current control unit 23 executes feedback control using the PI control or the PID control for a current deviation ΔIL that is a deviation between the current command value iL' calculated by the voltage control unit 22 and the phase current iL, thereby calculating a voltage command value VL' for making the current deviation ΔIL close to zero. The current control unit 23 outputs the calculated voltage command value VL' to the PWM control unit 50.

Figure 3:
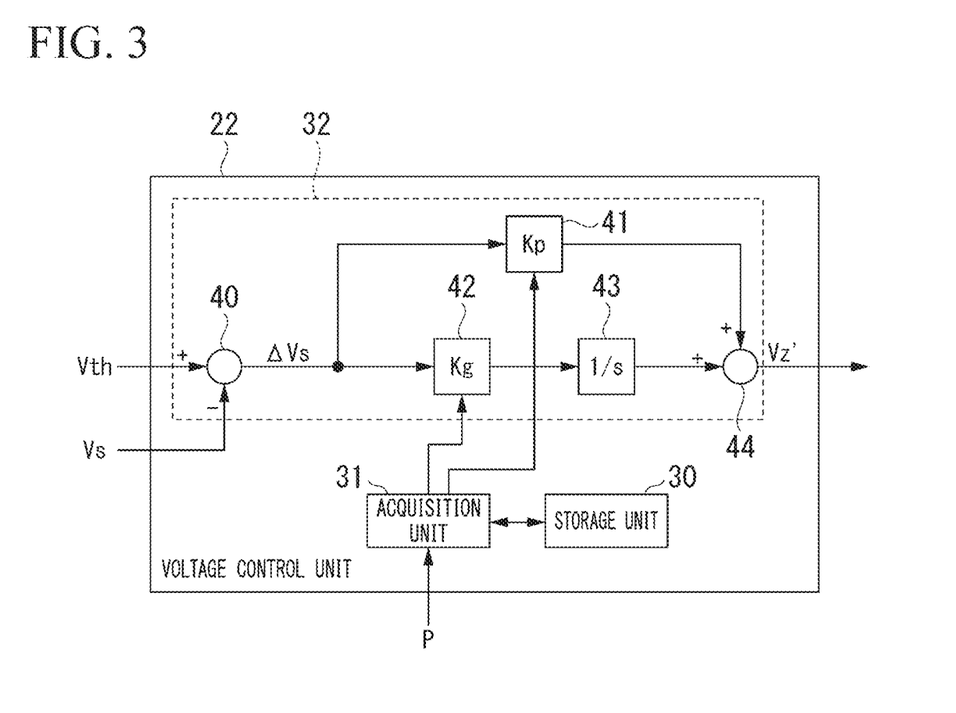
FIG. 3 is a schematic configuration diagram of a voltage control unit 22 according to the same embodiment.

In the following description, a schematic configuration of the voltage control unit 22 according to the present embodiment will be described with reference to FIG. 3. FIG. 3 is the schematic configuration diagram of the voltage control unit 22 according to the present embodiment.

As shown in FIG. 3, the voltage control unit 22 includes a storage unit 30, an acquisition unit 31, and a calculation unit 32.

Figure 4:
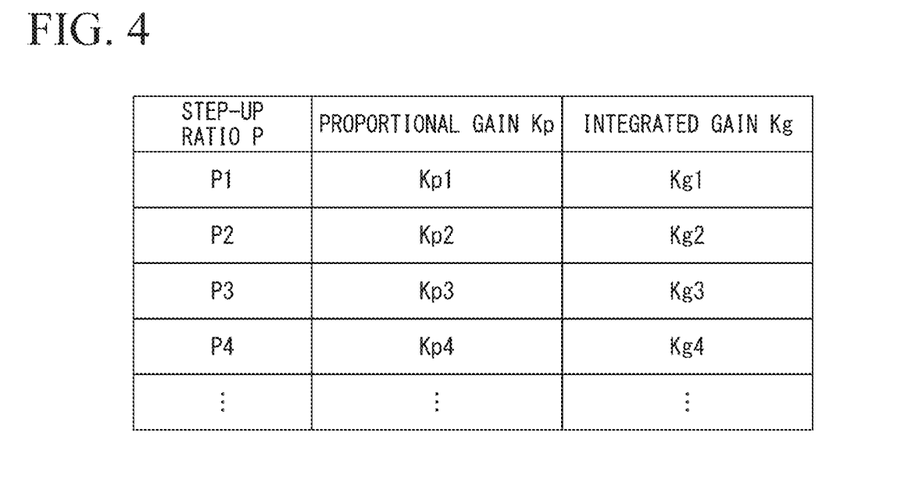
FIG. 4 is an example that shows a proportional gain map and an integrated gain map according to the same embodiment.

The storage unit 30 stores a proportional gain map that is information indicating a corresponding relationship between the step-up ratio P and the proportional gain Kp, and an integrated gain map that is information indicating a corresponding relationship between the step-up ratio P and the integrated gain Kg. FIG. 4 is an example which shows a proportional gain map and an integrated gain map. In the example shown in FIG. 4, the proportional gain map and the integrated gain map are stored in the storage unit 30 as one map, but the present invention is not limited thereto. That is, the proportional gain map and the integrated gain map may also be stored in the storage unit 30 as separate maps.

The proportional gain map may be determined experimentally or theoretically such that the proportional gain Kp can be determined on the basis of the step-up ratio P. For example, the proportional gain map may also be a table which has each step-up ratio P and a proportional gain Kp associated with each step-up ratio P. However, the proportional gain map is not limited to this configuration as long as it is information indicating the corresponding relationship between the step-up ratio P and the proportional gain Kp, and is not limited to the table described above but may also be a mathematical formula.

The integrated gain map may be determined experimentally or theoretically such that the integrated gain Kg can be determined on the basis of the step-up ratio P. For example, the integrated gain map may also be a table that has each step-up ratio P and an integrated gain Kg associated with each step-up ratio P. However, the integrated gain map is not limited to this configuration as long as it is information indicating the corresponding relationship between the step-up ratio P and the integrated gain Kg, and is not limited to the table described above but may also be a mathematical formula.

The acquisition unit 31 acquires the step-up ratio P calculated by the step-up ratio calculation unit 21. Then, the acquisition unit 31 refers to the proportional gain map, and acquires a proportional gain Kp corresponding to the step-up ratio P calculated by the step-up ratio calculation unit 21 from the proportional gain map. Then, the acquisition unit 31 outputs the proportional gain Kp acquired from the proportional gain map to the proportional gain multiplication unit 41.

In addition, the acquisition unit 31 refers to the integrated gain map and acquires an integrated gain Kg corresponding to the step-up ratio P calculated by the step-up ratio calculation unit 21 from the integrated gain map. Then, the acquisition unit 31 outputs the integrated gain Kg acquired from the integrated gain map to the integrated gain multiplication unit 42.

The calculation unit 32 includes a subtractor 40, a proportional gain multiplication unit 41, an integrated gain multiplication unit 42, an integrator 43, and an adder 44.

The subtractor 40 calculates the voltage deviation AVs by subtracting the secondary-side voltage Vs from the target voltage Vth.

The proportional gain multiplication unit 41 multiplies the voltage deviation AVs by the proportional gain Kp output from the acquisition unit 31 and outputs a result to the adder 44.

The integrated gain multiplication unit 42 multiplies the voltage deviation AVs by the integrated gain Kg output from the acquisition unit 31 and outputs a result to the integrator 43.

The integrator 43 obtains an integrated value by integrating outputs from the integrated gain multiplication unit 42, and outputs this integrated value to the adder 44. Note that s shown in FIG. 3 is an operator of a Laplace transform, with s representing differentiation and 1/s representing integration.

The adder 44 obtains a voltage command value Vz' by adding an output from the proportional gain multiplication unit 41 and an integrated value from the integrator 43.

Figure 5:
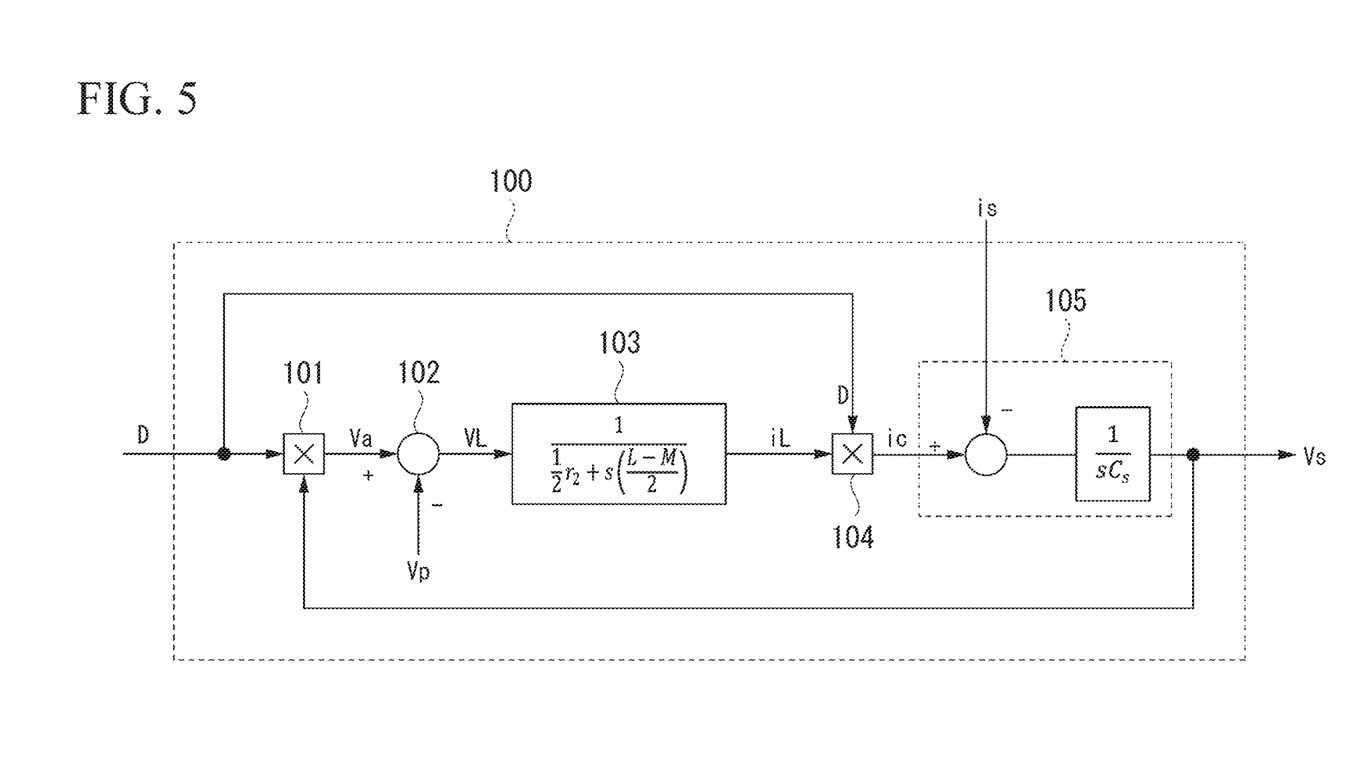
FIG. 5 is a diagram which shows a plant model 100 in which a multi-phase converter 2 according to the same embodiment is described using a mathematical model.

Next, a plant model 100 in which the multi-phase converter 2 is described by a mathematical model will be described with reference to FIG. 5. The plant model 100 of the multi-phase converter 2 is a model in which two plant models with different step-up ratios (for example, a plant model with a step-up ratio of "2" and a plant model with a step-up ratio lower than "2") are approximated and expressed by one mathematical model.

A first block 101 is modeled on the switching elements Q1 to Q4, and multiplies a duty ratio D by the secondary-side voltage Vs corresponding to a step-up voltage.

A second block 102 outputs a reactor voltage VL that is a voltage generated in the reactor L through which the phase current iL flows. That is, the second block 102 models a formula for obtaining the reactor voltage VL by subtracting the primary-side voltage Vp from an output Va of the first block 101.

A third block 103 is modeled on the reactor L1 and the reactor L2 which are magnetically coupled. r2 is equivalent series resistance. L is self-inductance of the reactor L1 and the reactor L2, and M is mutual inductance.

A fourth block 104 multiplies the phase current iL output from the third block 103 by the duty ratio D, thereby outputting a current (hereinafter referred to as a "secondary-side current") output from the multi-phase converter 2.

A fifth block 105 shows the secondary-side capacitor 7, and models a phenomenon in which the secondary-side capacitor 7 is charged and discharged due to a difference between a secondary-side current ic output from the fourth block 104 and a load current that is a current flowing through a load (motor M) connected to the multi-phase converter 2. The fifth block 105 sets the secondary-side current ic and the load current is as an input and outputs the secondary-side voltage Vs.

Next, a flow of an operation of the control device 4 according to the present embodiment will be described.

The control device 4 generates a voltage command value VL' for causing the step-up voltage Vc of the multi-phase converter 2 to follow the target voltage Vth under the PI control. Then, the control device 4 calculates a duty ratio D for controlling the multi-phase converter 2 on the basis of this voltage command value VL', and outputs a driving signal (a gate signal) of this duty ratio D to the multi-phase converter 2. At this time, the control device 4 sets a control value for performing the PI control to be variable instead of a fixed value. Specifically, the control device 4 obtains a step-up ratio P of the multi-phase converter 2 and changes the control gain on the basis of this step-up ratio P. For example, the feedback control unit 20 sets the control gain to be a predetermined fixed value when the step-up ratio P exceeds a predetermined step-up ratio, and changes the control gain to be a value higher than the fixed value when the step-up ratio P is equal to or less than the predetermined step-up ratio. In this manner, the feedback control unit 20 performs control such that the control gain in the feedback control is different depending on when the step-up ratio P exceeds the predetermined step-up ratio and when the step-up ratio P is equal to or less than the predetermined step-up ratio. Therefore, the control device 4 can prevent the step-up voltage of the multi-phase converter 2 from causing hunting and can improve the controllability of the multi-phase converter 2. The control gain changed on the basis of the step-up ratio P may be a proportional gain, an integrated gain, or both. That is, the control gain changed on the basis of the step-up ratio P is at least one of the proportional gain and the integrated gain.

Figure 6A:
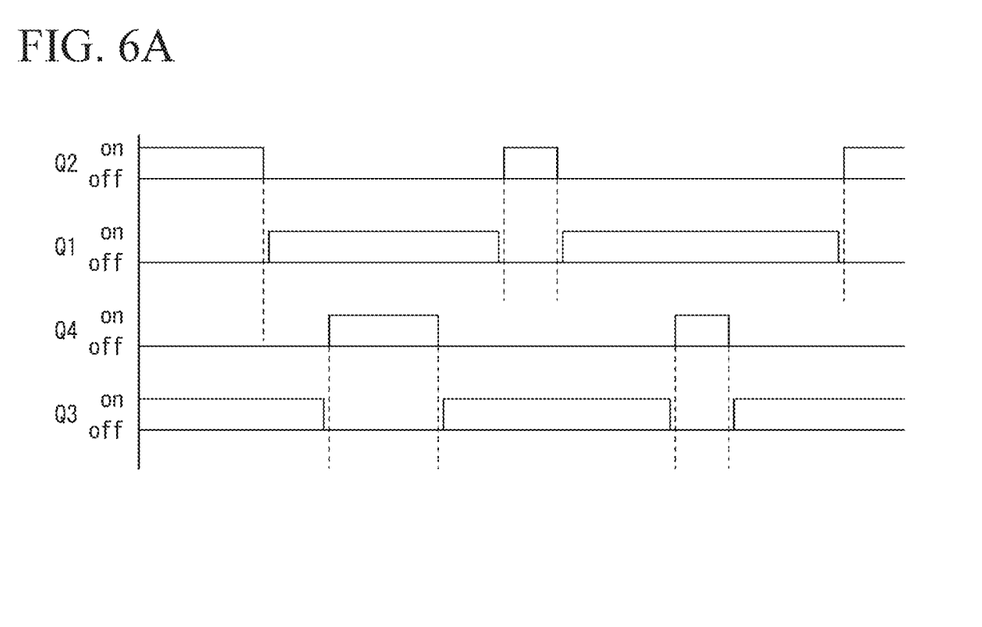
FIG. 6A is a switching sequence diagram in the multi-phase converter 2 according to the same embodiment, which shows a case in which a step-up ratio P exceeds "2."
Figure 6B:
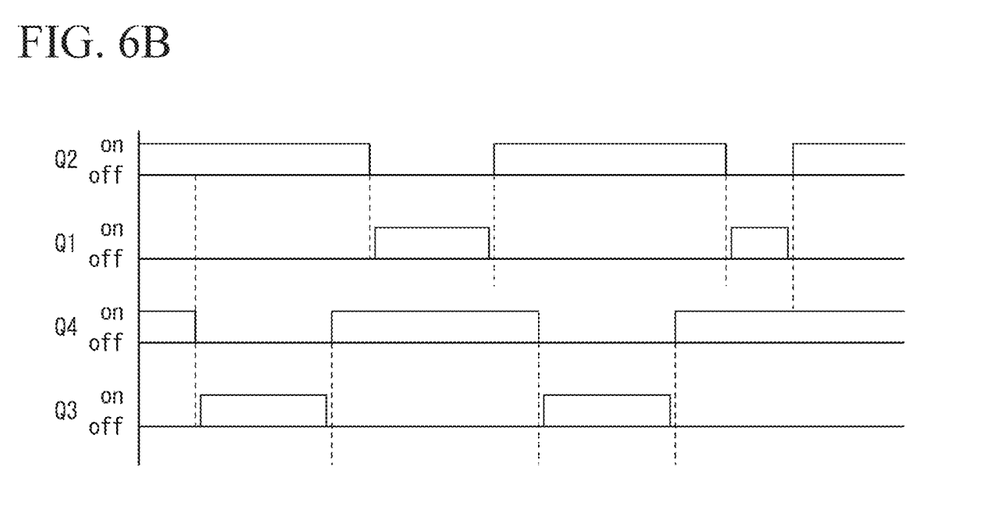
FIG. 6B is a switching sequence diagram in the multi-phase converter 2 according to the same embodiment, which shows a case in which the step-up ratio is "2" or less.

FIG. 6A and FIG. 6B are sequence diagrams of switching in a two-phase multi-phase converter 2. FIG. 6A shows a case in which the step-up ratio P exceeds "2." FIG. 6B shows a case in which the step-up ratio P is equal to or less than "2." As shown in FIG. 6A, when the step-up ratio P exceeds "2," a period in which the switching element Q2 of a lower arm is in an ON state and a period in which the switching element Q4 is in the ON state do not overlap each other. On the other hand, as shown in FIG. 6B, when the step-up ratio P is equal to or less than "2," the period in which the switching element Q2 of the lower arm is in the ON state and the period in which the switching element Q4 is in the ON state have a period of overlapping each other. The existence of this overlapping period is one factor that causes hunting of the step-up voltage Vc. Therefore, as an example, the feedback control unit 20 changes the control gain to a higher value when the step-up ratio P is equal to or less than "2" in the two-phase multi-phase converter 2, thereby suppressing the hunting of the step-up voltage Vc. Specifically, the feedback control unit 20 sets the control gain to be a first gain when the step-up ratio P exceeds "2," and sets the control gain to be a second gain that is higher than the first gain when the step-up ratio P is equal to or less than "2" in the two-phase multi-phase converter 2. Note that the feedback control unit 20 may continuously change the control gain between the first gain and the second gain, or may change the control gain step by step.

Although one embodiment of the present invention has been described in detail with reference to the drawings, the specific configuration is not limited to this embodiment, and includes design changes and the like within a range not departing from the gist of the present invention.

For example, the following modified example of the embodiment described above can also be adopted. In the following description, differences from the embodiment described above will be mainly described, and other details will be assumed to be the same as in the embodiment described above to avoid duplicated description.

MODIFIED EXAMPLE

Figure 7:
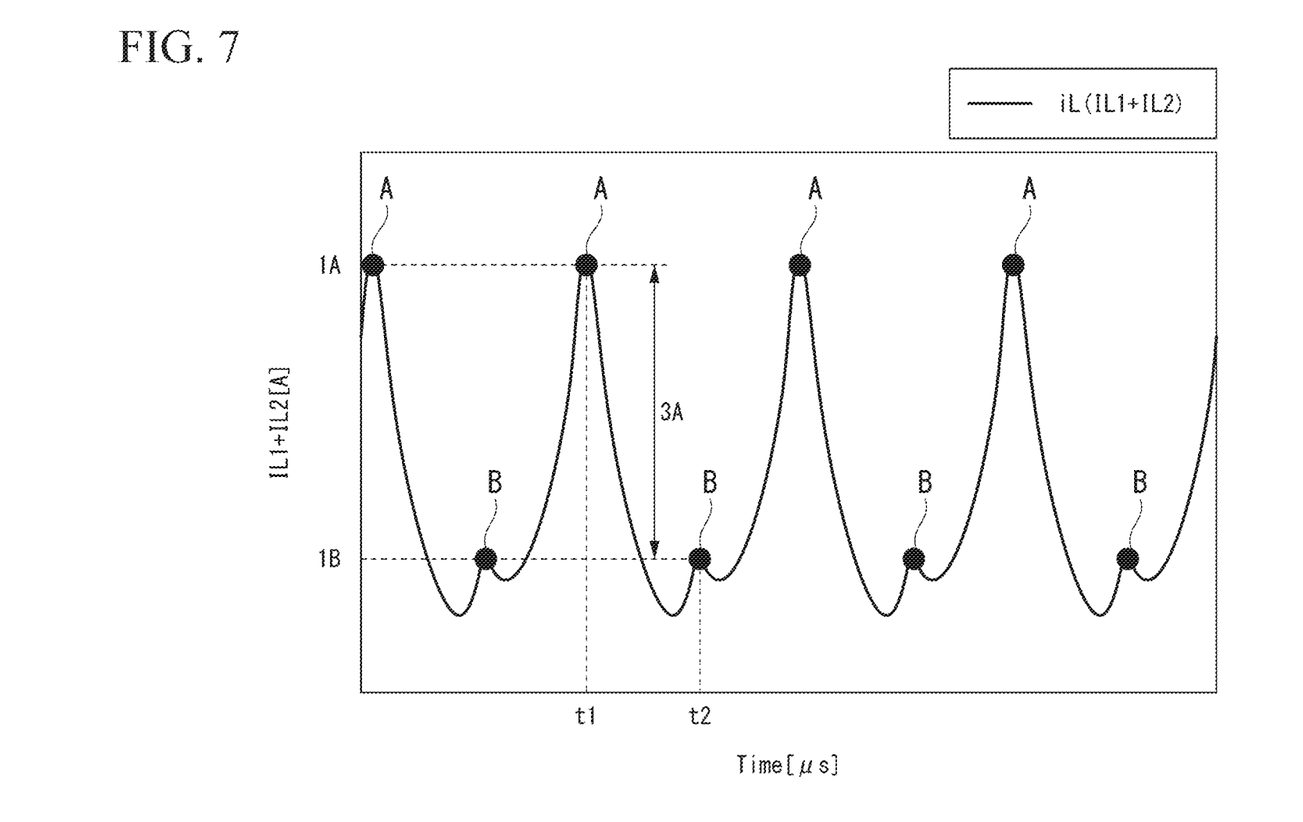
FIG. 7 is a diagram which shows an example of a waveform of a phase current iL detected by a current sensor 10 according to the same embodiment.

The control unit 11 according to the present embodiment may detect a drift current iLab between the first phase current iLa and the second phase current iLb on the basis of the phase current iL detected by the current sensor 10. In the following description, a method of detecting the drift current iLab according to the present modified example will be described with reference to FIG. 7. FIG. 7 is a diagram which shows an example of a waveform of the phase current iL detected by the current sensor 10, and is a graph in which the horizontal axis represents time and the vertical axis represents a total phase current. As shown in FIG. 7, the waveform of the phase current iL detected by the current sensor 10 has roughly two types of change points A and B. These change points A and B are points at which the phase current iL changes from an increase to a decrease.

For example, a change point A indicates a timing (a time t1) at which the switching element Q2 is switched from the ON state to an OFF state. Therefore, the phase current iL at the change point A indicates a maximum value of the first phase current iLa. On the other hand, a change point B indicates a timing (a time t2) at which the switching element Q4 is switched from the ON state to the OFF state. Therefore, the phase current iL at the change point B indicates a maximum value of the second phase current iLb. Furthermore, the reactor L1 and the reactor L2 have a characteristic in which the self-inductance decreases if a current flowing through phases thereof increases, and as a result, a ripple current of a phase with a larger current increases. For this reason, there is a deviation in the maximum value of the total phase current at the change point A and the change point B in accordance with the drift current in the waveform of the total phase current. Here, since a difference in a switching phase between the switching elements Q1 and Q2 and the switching elements Q3 and Q4 is 180° in the same manner as in the embodiment described above, the change point A and the change point B occur alternately every 180° in phase in the present modified example.

Therefore, the control unit 11 detects the drift current iLab on the basis of a value of a corresponding phase current iL when the phase current iL detected by the current sensor 10 is changed from an increase to a decrease (hereinafter referred to as a "change point phase current"). That is, the control unit 11 detects a difference between a change point phase current IA that is a phase current iL at the change point A and a change point phase current IB that is a phase current iL at the change point B as the drift current iLab in the phase current iL detected by the current sensor 10.

Note that a method of acquiring the change point phase current IA and the change point phase current IB in the control unit 11 is not particularly limited, but, for example, these change point phase currents can be acquired by the following methods (a) and (b).

(a) The control unit 11 acquires the change point phase currents IA and IB by acquiring a phase current iL when it changes from an increase to a decrease within a predetermined period in the phase current iL detected by the current sensor 10.

(b) The control unit 11 acquires each phase current iL output from the current sensor 10 when each of the switching elements Q2 and Q4 is switched from the ON state to the OFF state as each of the change point phase currents IA and IB.

The method (b) described above can be achieved by the control unit 11 synchronizing a timing at which the current sensor 10 acquires the phase current iL (hereinafter referred to as an "acquiring timing") and each timing at which each of the switching elements Q2 and Q4 is turned off.

However, when the acquiring timing of the control unit 11 and each timing at which each of the switching elements Q2 and Q4 is turned off cannot be synchronized, the following method can be used instead. It is possible to acquire the change point phase current IA and the change point phase current IB using the method of (b) described above by providing a delay unit that delays an output from the current sensor 10 by a predetermined time in the control device 4. However, the output from the current sensor 10 that is delayed by the delay unit is an output different from a phase current iL used in the feedback control unit 20. For example, the output of the current sensor 10 is branched into two, one output is used for drift current detection and the other output is used for the feedback control unit 20.

Here, the case in which the acquiring timing of the control unit 11 and each timing at which each of the switching elements Q2 and Q4 is turned off cannot be synchronized is, for example, the case in which the acquiring timing of the control unit 11 is a timing of a peak or a valley of a carrier wave C generated in the control device 4 instead of each timing at which the switching elements Q2 and Q4 are turned off. In (b) described above, even if the delay unit is not provided, when the acquiring timing of the control unit 11 and each timing at which each of the switching elements Q2 and Q4 is turned off can be synchronized, the delay unit is not an essential constituent of the control device 4.

Then, the control unit 11 corrects the voltage command value VL' such that the detected drift current iLab disappears. For example, the control unit 11 may correct the voltage command value VL' by obtaining a command value V* for bringing the drift current iLab closer to zero, performing PI control or PID control on the drift current iLab, and adding or subtracting the command value V* to or from the voltage command value VL'. Alternatively, the control unit 11 may correct the voltage command value VL' by obtaining a coefficient corresponding to the drift current iLab, and multiplying the drift current voltage command value VL' by this coefficient. Alternatively, the control unit 11 may correct the voltage command value VL' by obtaining two coefficients corresponding to the drift current iLab, multiplying a voltage command value for generating the first PWM signal by one of these coefficients, and multiplying a voltage command value for generating the second PWM signal by the other coefficient.

As described above, the control device 4 according to the present embodiment changes the control gain in the feedback control on the basis of the step-up ratio P of the multi-phase converter 2 in which the reactors L1 and L2 are magnetically coupled to each other.

According to such a configuration, when two plant models with different step-up ratios are approximated to one plant model and the multi-phase converter 2 is controlled by one control device, a mismatch of the control gain is less likely to occur, and hunting of the step-up voltage Vc of the multi-phase converter 2 can be suppressed. As a result, the controllability of the multi-phase converter 2 is improved. For example, the multi-phase converter 2 is controlled by one control device using a mathematical model that represents a plant model with a first step-up ratio and a plant model with a second step-up ratio lower than the first step-up ratio in one plant model. In this case, if the control gain is tuned to the first step-up ratio, the step-up voltage Vc may be hunted when the multi-phase converter 2 has the second step-up ratio.

Here, since the control device 4 changes the control gain according to the step-up ratio P, the step-up voltage Vc is not hunted and the controllability of the multi-phase converter 2 is improved in the present embodiment.

All or a part of the control device 4 described above may be realized by a computer. In this case, the computer may include a processor such as a CPU or a GPU, and a computer-readable recording medium. Then, a program for realizing all or a part of functions of the control device 4 described above is recorded on the computer-readable recording medium, and the program recorded on this recording medium may be realized by being read and executed by the processor. Here, "computer-readable recording medium" refers to a flexible disk, a magneto-optical disc, a portable medium such as a ROM or a CD-ROM, or a storage device such as a hard disk embedded in a computer system. Furthermore, the "computer-readable recording medium" may include a recording medium that dynamically holds a program for a short period of time such as a communication line when a program is transmitted via a network like the Internet or a communication line like a telephone line, and a recording medium that holds a program for a certain period of time such as a volatile memory in a computer system that serves as a server or a client in this case. Moreover, the program may be a program for realizing some of the functions described above, a program for realizing the functions described above in combination with a program already recorded on the computer system, and a program that is realized using a programmable logic device such as an FPGA.

EXPLANATION OF REFERENCES

2 Multi-phase converter
4 Control device (multi-phase converter control device)
6a First converter (converter)
6b Second converter (converter)
11 Control unit
12 Drive unit
20 Feedback control unit
21 Step-up ratio calculation unit
22 Voltage control unit
23 Current control unit
30 Storage unit
31 Acquisition unit
32 Calculation unit
50 PWM control unit

What is claimed is:

1. A multi-phase converter control device that performs PWM control on driving of a multi-phase converter configured such that a plurality of converters connected to each other in parallel have reactors, and the reactors are magnetically coupled with each other and step up an input voltage to generate a step-up voltage, the multi-phase converter control device comprising:
    a feedback control unit configured to perform feedback control such that the step-up voltage is a target voltage;
    a PWM control unit configured to generate a PWM signal on the basis of a voltage command value output from the feedback control unit; and
    a drive unit configured to drive the multi-phase converter on the basis of the PWM signal,
    wherein the feedback control unit calculates a step-up ratio of the multi-phase converter and changes a control gain in the feedback control on the basis of the step-up ratio,
    wherein the feedback control unit includes:
        a voltage control unit configured to generate a current command value by applying PI control to a deviation between the step-up voltage and the target voltage;
        a current control unit configured to generate the voltage command value by applying PI control to a deviation between the current command value and a phase current input to the multiphase converter; and
        a step-up ratio calculation unit configured to calculate the step-up ratio, and
    wherein the voltage control unit changes the control gain for generating the current command value on the basis of the step-up ratio.

2. The multi-phase converter control device according to claim 1,
    wherein the voltage control unit includes:
    a storage unit configured to store a proportional gain map indicating a corresponding relationship between the step-up ratio and a proportional gain, and an integrated gain map indicating a corresponding relationship between the step-up ratio and an integrated gain;
    an acquisition unit configured to acquire the proportional gain corresponding to the step-up ratio obtained by the step-up ratio calculation unit from the proportional gain map, and to acquire the integrated gain corresponding to the step-up ratio from the integrated gain map; and a calculation unit configured to execute the PI control using the proportional gain and the integrated gain acquired by the acquisition unit.

3. The multi-phase converter control device according to claim 2,
wherein the feedback control unit changes the control gain in the feedback control on the basis of the step-up ratio when the step-up ratio is equal to or less than a predetermined step-up ratio.

4. The multi-phase converter control device according to claim 1,
wherein the feedback control unit changes the control gain in the feedback control on the basis of the step-up ratio when the step-up ratio is equal to or less than a predetermined step-up ratio.

5. The multi-phase converter control device according to claim 1,
wherein the feedback control unit changes the control gain in the feedback control on the basis of the step-up ratio when the step-up ratio is equal to or less than a predetermined step-up ratio.

6. The multi-phase converter control device according to claim 1,
wherein the feedback control is for generating the voltage command value.

7. The multi-phase converter control device according to claim 6,
wherein the feedback control is PI control or PID control.

* * * * *